US012595816B1

(12) United States Patent
Wang et al.

(10) Patent No.: US 12,595,816 B1
(45) Date of Patent: Apr. 7, 2026

(54) QUICK-CONNECT ASSEMBLY AND FURNITURE WITH THE SAME

(71) Applicant: Shenzhen Xinyiheng E-commerce Co., Ltd., Shenzhen (CN)

(72) Inventors: Ping Wang, Shenzhen (CN); Chengcheng Ma, Shenzhen (CN); Wei Wang, Shenzhen (CN)

(73) Assignee: Shenzhen Xinyiheng E-commerce Co., Ltd., Shenzhen (CN)

( * ) Notice: Subject to any disclaimer, the term of this patent is extended or adjusted under 35 U.S.C. 154(b) by 0 days.

(21) Appl. No.: 19/369,113

(22) Filed: Oct. 24, 2025

(30) Foreign Application Priority Data

Aug. 7, 2025 (CN) .......................... 202521680555.5

(51) Int. Cl.
*F16B 12/40* (2006.01)

(52) U.S. Cl.
CPC ........ *F16B 12/40* (2013.01); *F16B 2012/403* (2013.01)

(58) Field of Classification Search
CPC ......... Y10T 403/7007; Y10T 403/7009; A47B 87/0246; A47B 47/0083; A47B 57/54; A47B 57/06; A47B 96/006; F16B 12/02; F16B 9/054; F16B 7/20; F16L 37/252
See application file for complete search history.

(56) References Cited

U.S. PATENT DOCUMENTS

| | | | | |
|---|---|---|---|---|
| 3,338,605 | A | * | 8/1967 | Stoeber .................. A47B 96/14 |
| | | | | 403/174 |
| 3,645,562 | A | * | 2/1972 | Fandetti ................ F16L 37/252 |
| | | | | 285/73 |
| 4,418,946 | A | * | 12/1983 | Gambon ................. F16B 12/40 |
| | | | | 439/286 |
| 5,904,420 | A | * | 5/1999 | Dedoes ................... B01F 35/42 |
| | | | | 366/198 |
| 6,260,488 | B1 | * | 7/2001 | Yang ...................... F16B 12/40 |
| | | | | 108/107 |
| 6,796,565 | B2 | * | 9/2004 | Choi ......................... B62B 3/02 |
| | | | | 280/47.35 |
| 2005/0031407 | A1 | * | 2/2005 | Kek ......................... F16B 9/054 |
| | | | | 403/231 |
| 2017/0057420 | A1 | * | 3/2017 | Fiedler .................. F16M 11/16 |
| 2024/0057766 | A1 | * | 2/2024 | Magdalena ............ A47B 57/26 |

* cited by examiner

*Primary Examiner* — Daniel J Wiley
(74) *Attorney, Agent, or Firm* — ScienBiziP, P.C.

(57) ABSTRACT

A quick-connect assembly and furniture incorporating the same are provided. The quick-connect assembly comprises a first connector and a second connector that are detachably coupled by relative rotation. The first connector features a recess with inwardly protruding helical segments, each having a first helix angle and spanning an arc of less than 180 degrees. The corresponding second connector has an insertion part with outwardly protruding helical segments, each having a matching second helix angle and spanning an arc of less than 180 degrees. When engaged and rotated, the helical segments of the second connector slide along and abut against the support surfaces of the helical segments on the first connector. A rotation limiting mechanism, comprising an elastic element and a limiting groove, restricts the relative rotation between the connectors to no more than 360 degrees by means of the elastic element being received in the limiting groove upon their abutment. This application thereby provides a simple and reliable quick-connect mechanism.

20 Claims, 13 Drawing Sheets

100

11

10

13

30(35)

QUICK-CONNECT ASSEMBLY AND FURNITURE WITH THE SAME

RELATED APPLICATIONS

This application claims the benefit of priority to Chinese Patent Application Number 202521680555.5 filed on Aug. 7, 2025, in the China National Intellectual Property Administration. The entire contents of the above-identified application are hereby incorporated by reference.

TECHNICAL FIELD

The present disclosure relates to the technical field of quick-connect assembly, and in particular, to a quick-connect assembly and furniture with the same.

BACKGROUND

Conventionally, to facilitate transportation, furniture with support legs (e.g., shelves, coffee tables, etc.) is disassembled into multiple components and reassembled at the destination. In related technologies, adhesives or locking screws are typically utilized for the purpose of assembling. This approach, however, often results in a cumbersome and time-consuming process, necessitating the additional tools and time for both assembly and disassembly.

SUMMARY OF DISCLOSURE

The present disclosure addresses the aforementioned issues and provides a detachable quick-connect assembly and furniture equipped with the same.

One embodiment of the present disclosure provides a quick-connect assembly for connecting load-bearing components, comprising: a first connector and a second connector detachably and coaxially coupled to the first connector by rotating the first connector and the second connector relative to each other, wherein the first connector comprises a recess on one side of the first connector, and at least one protrusion block protruding inward from an inner wall of the recess, wherein each of the at least one protrusion block is a helical segment defining a first helix angle, each of the at least one protrusion block extends along a helical path, an arc defined by each of the at least one protrusion block is less than 180 degrees; the second connector comprises an insertion part, and at least one sliding block protruding outward from a peripheral surface of the insertion part, wherein each of the at least one sliding block is a helical segment defining a second helix angle, each of the at least one sliding block extends along the helical path, an arc defined by each of the at least one sliding block is less than 180 degrees, the second helix angle is equal to the first helix angle; in a case that the insertion part is inserted into the recess and the first connector and the second connector are rotated relative to each other, the at least one sliding block is slidable along and abuts against a support surface defined by the at least one protrusion block; the first connector further comprises a first elastic element, and the second connector further comprises a first limiting groove, wherein, in response to the first connector and the second connector are rotated to each other, the first elastic element moves relative to the first limiting groove; and the first connector is configured to restrict a relative rotation angle between the first connector and the second connector to no more than 360 degrees by receiving the first elastic element in response to the first limiting groove is moved proximate to the first elastic element and abuts against the first elastic element.

According to the present disclosure, a detachable quick-connect assembly can be furnished, and furniture equipped with the same can be provided.

BRIEF DESCRIPTION OF DRAWINGS

In order to illustrate the technical solution in embodiments of the present invention more clearly, the following briefly introduces accompanying drawings used in the description of the embodiments. Obviously, the accompanying drawings in the following description are only some embodiments of the present invention. Those of ordinary skill in the art can obtain other accompanying drawings from these accompanying drawings without any creative efforts.

DETAILED DESCRIPTION

Figure 1:
FIG. 1 is a perspective view illustrating an exemplary embodiment of a piece of furniture.

Reference will now be made in detail to representative embodiments illustrated in the accompanying drawings. The following descriptions are not intended to limit the embodiments to one preferred implementation. To the contrary, the embodiments described are intended to cover alternatives, modifications, and equivalents as can be included within the spirit and scope of the disclosure and as defined by the appended claims.

The present disclosure provides a connecting member, including a first connector, a second connector, and a support tube. Using this connecting member, tool-free quick assembly and disassembly of furniture with support legs can be achieved.

The quick-connect assembly 30 and furniture 100 equipped with the same according to a first embodiment will be described in detail below with reference to FIGS. 1 to 12.

First, the furniture 100 provided by the present disclosure will be described in detail with reference to FIGS. 1 to 3.

The furniture 100 includes multiple load-bearing components 10 and multiple quick-connect assemblies 30. The load-bearing components 10 are stacked and assembled into the furniture 100 via the quick-connect assemblies 30. In this embodiment, the furniture 100 is exemplified as a shelf but is not limited thereto. It may also include coffee tables, desks, chairs, bookshelves, etc. The load-bearing component 10 is configured to connect support legs. Referring to FIG. 1, the load-bearing component 10 is plate-shaped, such as a wooden board, plastic board, or metal board, as long as it can bear items.

Figure 2:
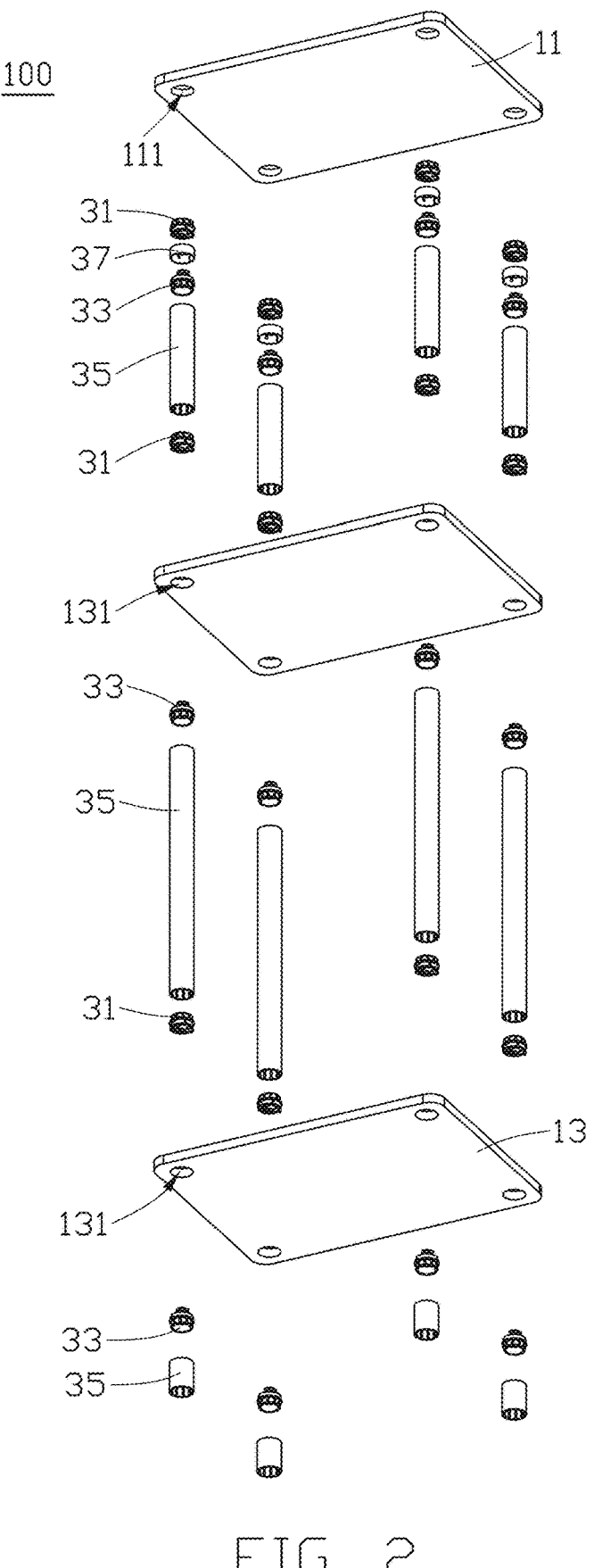
FIG. 2 is an exploded perspective view of the piece of furniture.
Figure 3:
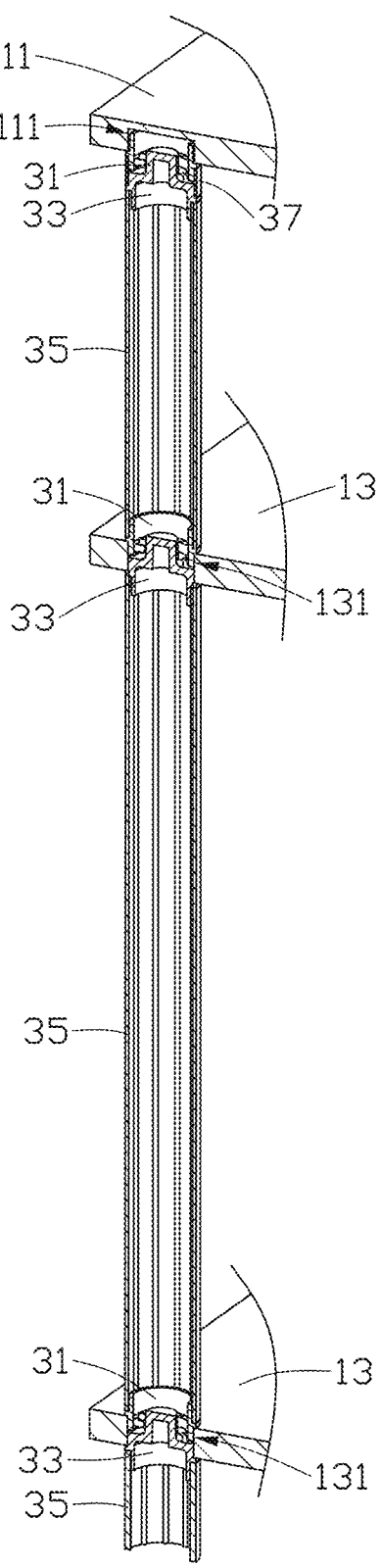
FIG. 3 is a cross-sectional view of a portion of the piece of furniture.
Figure 4:
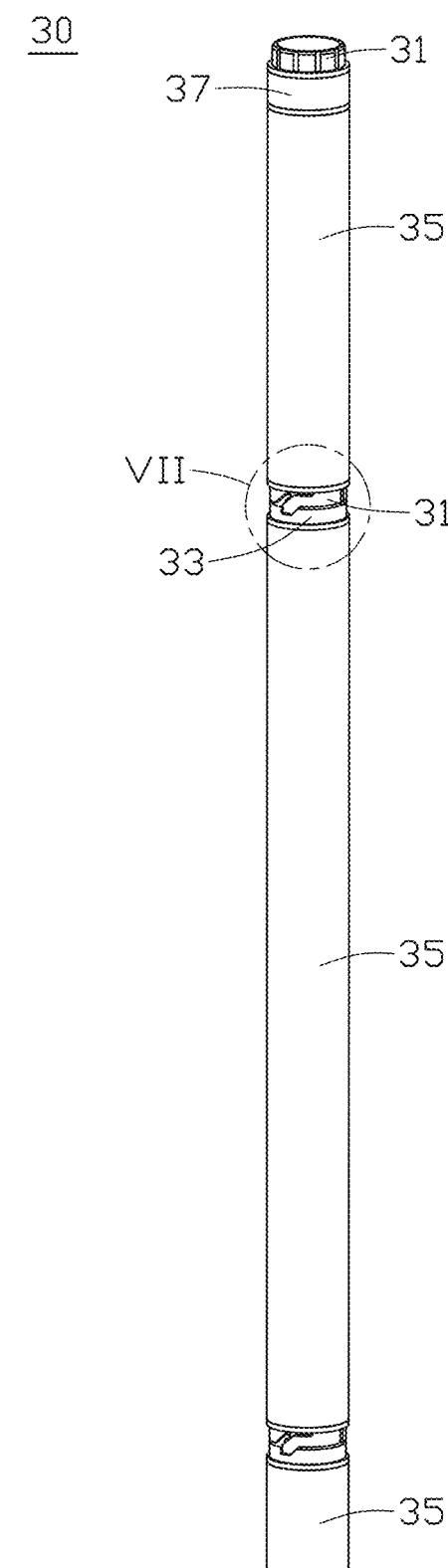
FIG. 4 is a perspective view of a quick-connect assembly configured for the piece of furniture.

Specifically, referring to FIGS. 1 to 3, the load-bearing component 10 may include a top plate 11 and multiple layer plates 13. On the side of the top plate 11 near the layer plates 13, four recessed slots 111 are formed near the corners for inserting and fixing the quick-connect assembly 30. Through-holes 131 are formed near the corners of the layer plates 13 for the quick-connect assembly 30 to pass through and fix. Alternatively, the load-bearing component 10 may only include the top plate 11. In other examples, the load-bearing component 10 may also be other structures, such as a frame.

Referring to FIGS. 1 to 4, the quick-connect assembly 30 is generally tubular and includes a female connector (also referred to as a first connector) 31 and a male connector (also referred to as a second connector) 33, and may further include a support tube 35 and an auxiliary support member 37. For ease of description, the length direction of the quick-connect assembly 30 is referred to as the vertical direction.

Figure 5:
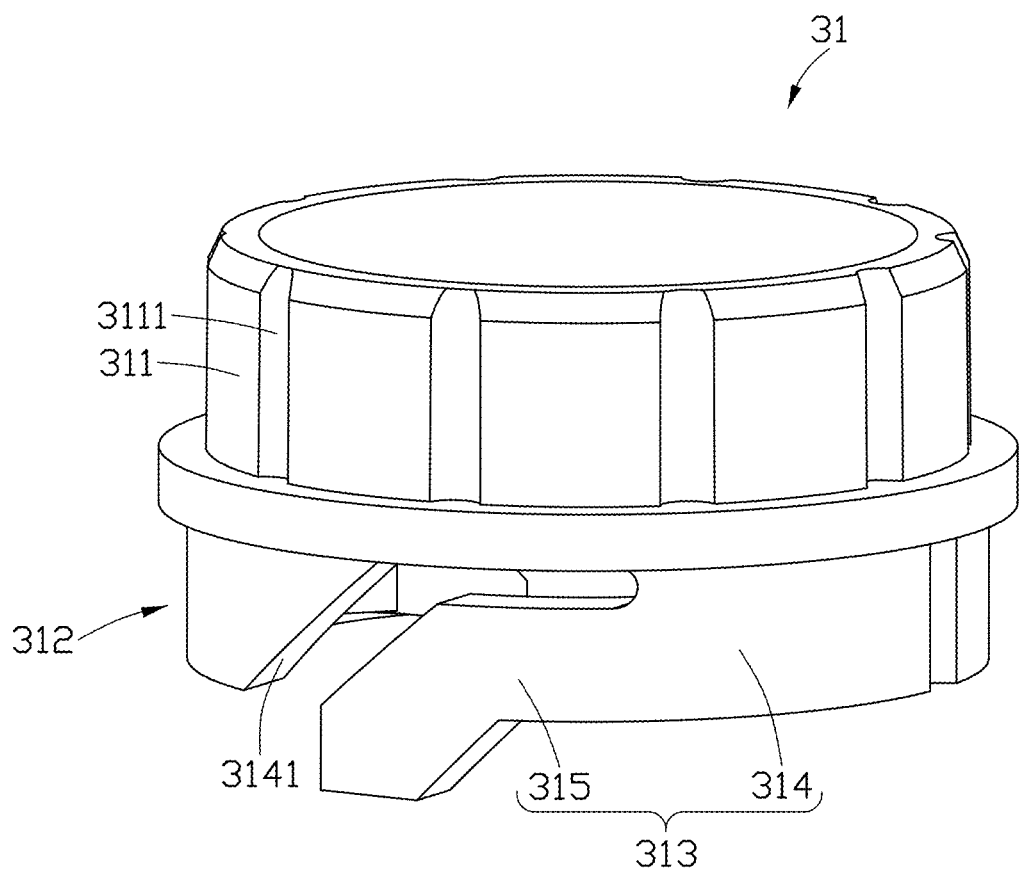
FIG. 5 is a perspective view of a first connector of the quick-connect assembly shown in FIG. 4.
Figure 6:
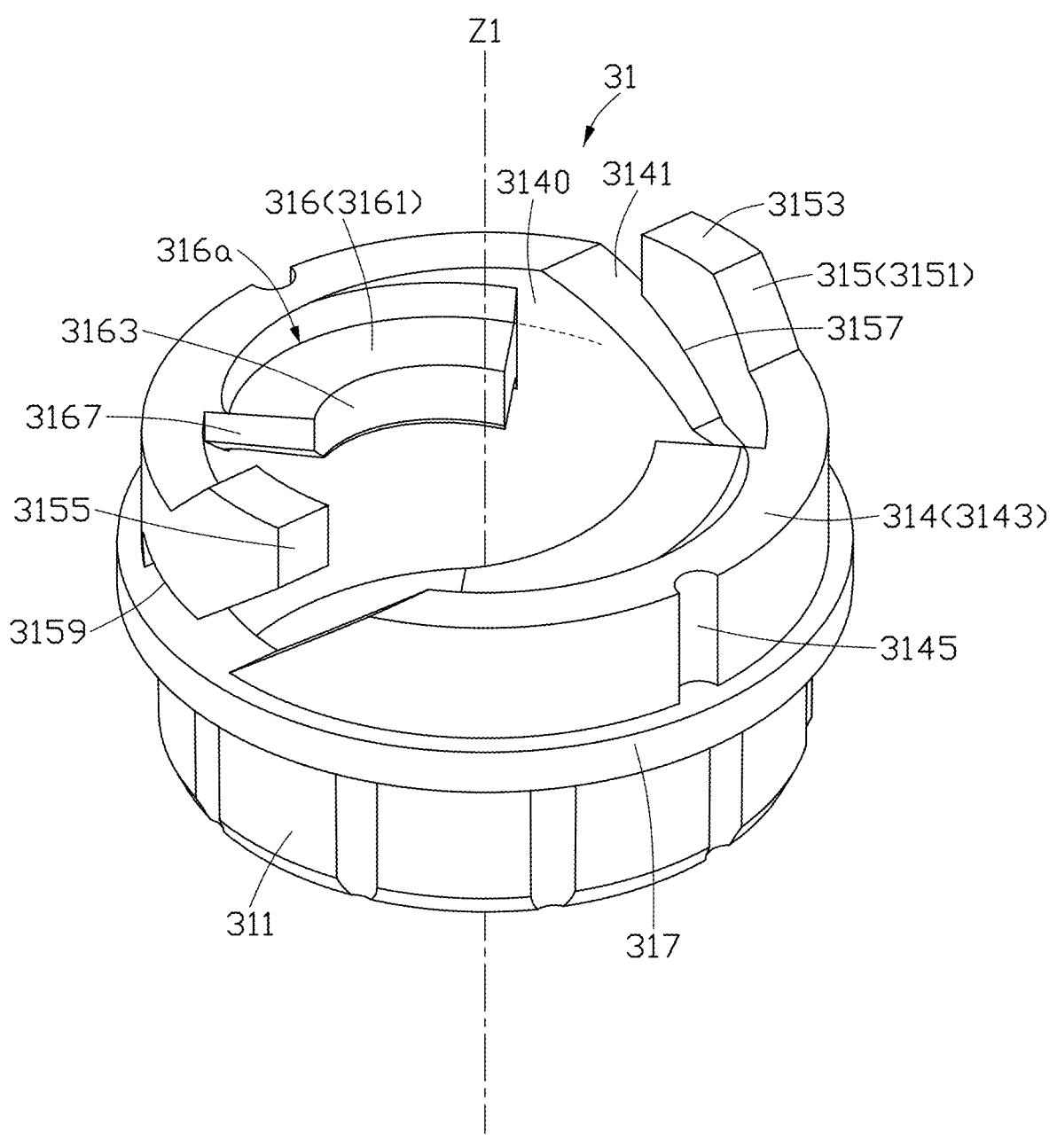
FIG. 6 is an alternative perspective view of a first connector of the quick-connect assembly.
Figure 7:
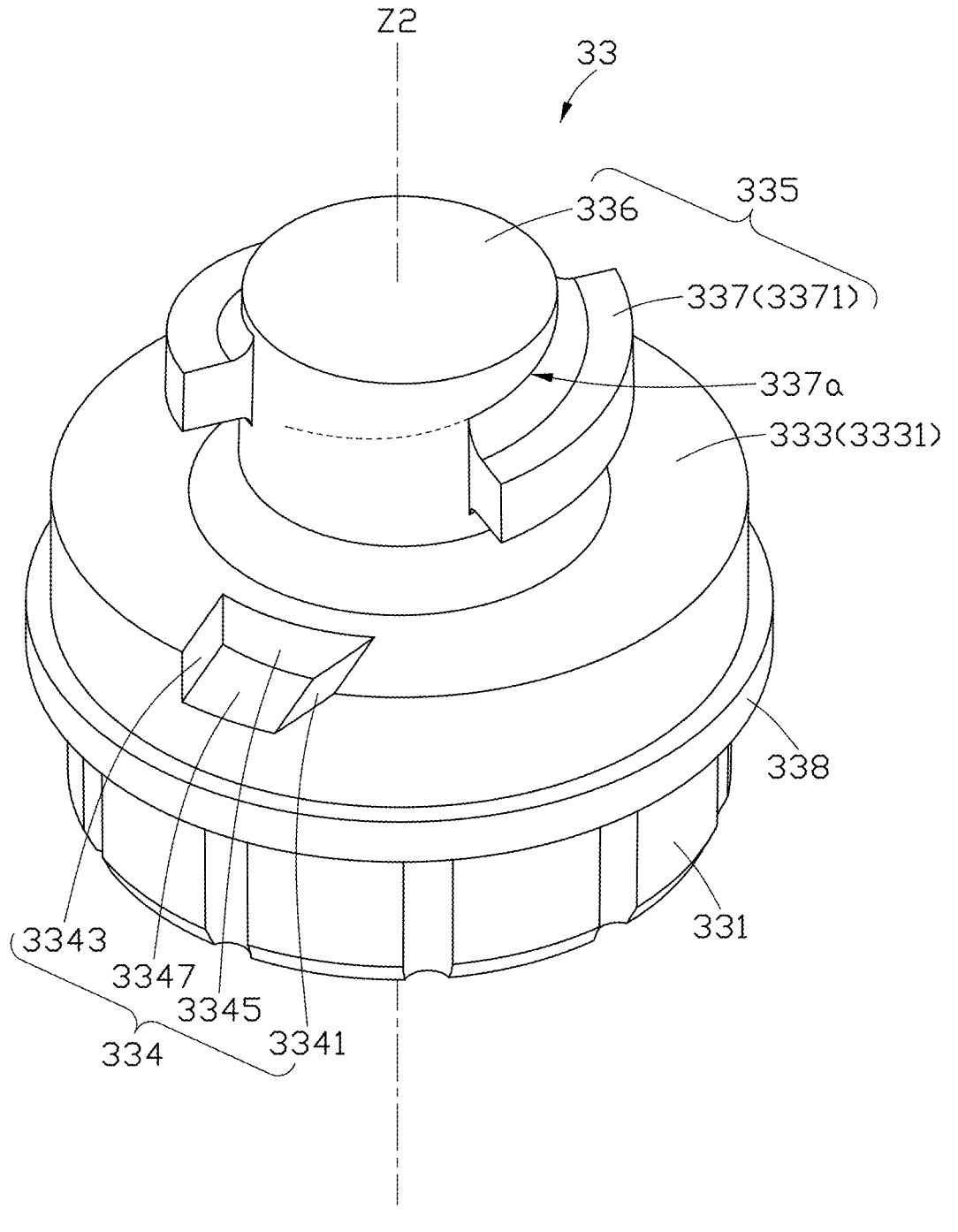
FIG. 7 is a perspective view of a second connector of the quick-connect assembly.

Referring to FIGS. 5 and 6, the first connector 31 is generally cylindrical and includes a first connection portion 311, a spiral engagement portion 312, and a flange portion 317 located between the first connection portion 311 and the spiral engagement portion 312.

The first connection portion 311 is used to fixedly connect to the top plate 11 of the load-bearing component 10 or the support tube 35, and is also referred to as the fixed connecting part. Specifically, the first connection portion 311 is in the shape of a hollow circular tube. For ease of installation, multiple axial grooves 3111 are equally spaced along its outer surface in the vertical direction. For installation, the first connector 31 can be pre-fixed to the top plate 11 by injecting adhesive into the axial grooves 3111 to secure it within the recessed slot 111. The diameter of the recessed slot 111 is approximately equal to that of the first connection portion 311 and smaller than that of the flange portion 317. The depth of the recessed slot 111 is approximately equal to the length of the first connection portion 311 in the vertical direction. When connecting the first connector 31 to the support tube 35, the axial grooves 3111 engage with longitudinal ribs 351 on the inner surface of the support tube 35 to prevent rotation of the first connector 31 relative to the support tube 35. It is understood that the first connector 31 is detachably connected to the top plate 11 or the support tube 35; during assembly, the first connection portion 311 of the first connector 31 is inserted into one end of the support tube 35, with the longitudinal ribs 351 of the support tube 35 fitting into the axial grooves 3111 of the first connection portion 311 to achieve a snap-fit connection between the first connector 31 and the support tube 35. To further enhance connection stability and installation convenience, the first connector 31 (i.e., the first connection portion 311) can also be pre-bonded to the support tube 35 with adhesive to form an integrated structure.

The flange portion 317 is annular and disposed of the first connecting portion 311 and the spiral engagement portion 312. Its outer diameter is larger than those of the first connecting portion 311 and the spiral engagement portion 312, so that it can be stably clamped between the load-bearing component 10 and the support tube 35 (or the auxiliary support 37) (see FIG. 3), thereby enhancing the stability of the assembled furniture 100. It is easily understandable that the outer diameter of the flange portion 317 is also larger than the diameters of the recessed slot 111 and the through-hole 131. The flange portion 317 protrudes from the outer sidewall of the first connecting portion 311, so that the flange portion 317 and the first connecting portion 311 form a stepped structure.

The spiral engagement portion 312 is used to connect to the second connector 33. Referring to FIGS. 5 and 6, the spiral engagement portion 312 extends circumferentially from the side of the flange portion 317 away from the first connection portion 311. The outer diameter of the spiral engagement portion 312 is equal to the diameter of the through-hole 131 of the layer plate 13 and the inner diameter of the auxiliary support member 37, allowing the spiral engagement portion 312 to fit snugly within the through-hole 131 or be sleeved by the auxiliary support member 37, thereby enhancing the stability of the assembled furniture 100. The spiral engagement portion 312 includes two main body portions 313 disposed symmetrically with respect to the central axis Z1 of the first connector 31, and the two main portions 313 are not in contact with each other. That is, the two main portions 313 are arranged in a centrally symmetric manner on the first connector 31. The two main portions 313 are also sometimes referred to as a first main portion and a second main portion, respectively.

Each main portion 313 includes a fixed portion 314 fixedly connected to the flange portion 317, an elastic element 315 formed to extend from one side of the fixed portion 314, and a protrusion block 316 formed to protrude from the inner surface of the main body portion 313.

The fixed portion 314 extends circumferentially from the flange portion 317 and includes an inclined surface 3141 and a top end 3143 parallel to the direction perpendicular to the vertical direction. Axial grooves 3145 are also formed on the side of the fixed portion 314, allowing the auxiliary support member 37 to be sleeved over the main portion 313 with longitudinal ribs 371 (see FIG. 10) engaging the axial grooves 3145 when the first connector 31 is connected to the top plate 11. For ease of manufacturing, axial grooves 3145 are provided in all fixed portions 314 in this embodiment. However, axial grooves 3145 may only be provided on the first connectors connected to the top plate 11. The auxiliary support member 37 is included to enhance stability but may be omitted if the first and second connectors can be stably connected without it.

One end of the elastic element 315 is fixedly connected to the fixed portion 314, and the other end is spaced apart from both the flange portion 317 and the fixed portion 314, such that the other end of the elastic element 315 forms a cantilever structure. Specifically, the elastic element 315 protrudes and extends along the circumferential direction of the fixed portion 314, and is spaced apart from the flange portion 317 (i.e., from the extended surface of the bottom end of the recess 3140) to form a first space. Additionally, the elastic element 315 is spaced apart from the inclined surface 3141 of the other main portion 313 to form a second space. The first and second spaces are connected, allowing the elastic element 315 to deform elastically within them. Referring to FIG. 6, in the uninstalled state, gaps (first and second spaces) exist between the elastic element 315 and the flange portion 317 and the inclined surface 3141 of the other main portion 313. When connecting the first connector 31 to the second connector 33, the elastic element 315 can deform elastically in the vertical direction relative to the fixed portion 314. After connection, at least part of the elastic element 315 is accommodated in a limiting groove 334 of the second connector 33, restricting circumferential movement.

The elastic element 315 is arrow-shaped, including a first surface 3151 inclined upward from the top end 3143, a second surface 3153 extending parallel to the top end 3143 from the end of the first surface 3151 away from the fixed portion 314, a third surface 3155 extending downward from the end of the second surface 3153 away from the first surface 3151, a fourth surface 3157 extending from the end of the third surface 3155 away from the second surface 3153 toward the fixed portion 314 at an inclination similar to the first surface 3151, and a fifth surface 3159 extending from the end of the fourth surface 3157 further toward the fixed portion 314 parallel to the flange portion 317. The fifth surface 3159 extends to the fixed portion 314. Preferably, the second surface 3153 and the third surface 3155 intersect vertically. This design ensures that the distance between the second surface 3153 (highest point) and the flange portion 317 is greater than that between the top end 3143 and the flange portion 317. When connecting the first connector 31 to the second connector 33, the elastic element 315 (specifically, the second surface 3153) contacts the second connector 33 and is compressed vertically, reducing the gaps between the elastic element 315 (specifically, the fourth surface 3157 and the fifth surface 3159) and the flange portion 317 and the inclined surface 3141 of the other main portion 313. This allows relative rotation between the first connector 31 and the second connector 33, with at least part of the elastic element 315 eventually accommodated in the limiting groove 334 of the second connector 33, restricting further circumferential movement.

The inner surface of the fixed portion 314 away from the first connection portion 311 is recessed to form a recess 3140. Two elastic elements 315 are arranged around one side of the recess 3140. The protrusion blocks 316 are formed on the side of the recess 3140 near the top end 3143. The two protrusion blocks 316 are also disposed symmetrically and at a distance relative to the central axis Z1 of the first connector 31, and the gap between the two protrusion blocks 316 is in communication with the recess 3140. Each protrusion block 316 is formed to extend obliquely from the side of the fixed portion 314 adjacent to the flange portion 317, along the circumferential direction of the fixed portion 314 and in a direction away from the first connecting portion 311. The two protrusion blocks 316 are spaced apart, each extending spirally from the side of the fixed portion 314 near the flange portion 317 circumferentially and away from the first connection portion 311. Viewed from the vertical direction, the protrusion blocks 316 are located centrally between the two elastic elements 315.

Referring to FIG. 6, each protrusion block 316 is configured as a helical plate extending along a helical path 316a and is a helical segment with a first helix angle. More specifically, the first helix angle is defined as the angle between a tangent to the helical path 316a and the central axis Z1 of the first connector 31. The protrusion block 316 includes a top surface 3161, an arc-shaped side surface 3163, a supporting surface 3165 (see FIG. 11), and two side surfaces 3167. The starting end of the protrusion block 316 is formed at the top end 3143, and its terminal end is helically formed to a position spaced a certain distance from the top end 3143. When viewed along the central axis Z1, the arc-shaped side surface 3163 lies on a circular trajectory concentric with the central axis Z1. The extension lines of the two side surfaces 3167 intersect the central axis Z1 at an angle of 90 degrees. That is, in the first embodiment, the protrusion block 316 extends helically with a radian of 90 degrees. The gaps between the side surfaces 3167 of the two adjacent protrusion blocks 316 and the fixed portion 314 (recess 3140) together form an insertion space for the insertion portion 335 of the second connector 33, which will be described below. Furthermore, the radian of the helical extension of the protrusion block 316 is not limited to 90 degrees and may be set to any value not exceeding 180 degrees, provided that it allows for the insertion of the insertion portion 335.

For ease of manufacturing, the first connector 31 is preferably integrally formed from high-strength, elastically deformable materials such as hard plastic or spring steel.

Referring to FIG. 6, the second connector 33 includes a second connection portion 331, a boss 333, an insertion part 335 extending from one side of the boss 333, and a flange portion 338 between the second connection portion 331 and the boss 333.

The second connection portion 331 (also referred to as the fixed connecting portion) is used to fixedly connect to the support tube 35. Its structure is the same as that of the first connection portion 311, so detailed description is omitted. For enhanced stability and ease of installation, the second connection portion 331 can also be pre-bonded to the support tube 35 with adhesive.

In this embodiment, the first connector 31 and the second connector 33 include the first connection portion 311 and the second connection portion 331, respectively. However, the connection parts may be omitted if the first and second connectors can be firmly connected to the top plate 11 and/or support tube 35 by other means, such as welding or bonding.

The flange portion 338 extends circumferentially from the second connection portion 331, forming a stepped structure with the second connection portion 331. It is located between the second connection portion 331 and the boss 333 and has the same structure as the flange portion 317, so detailed description is omitted.

Figure 8:
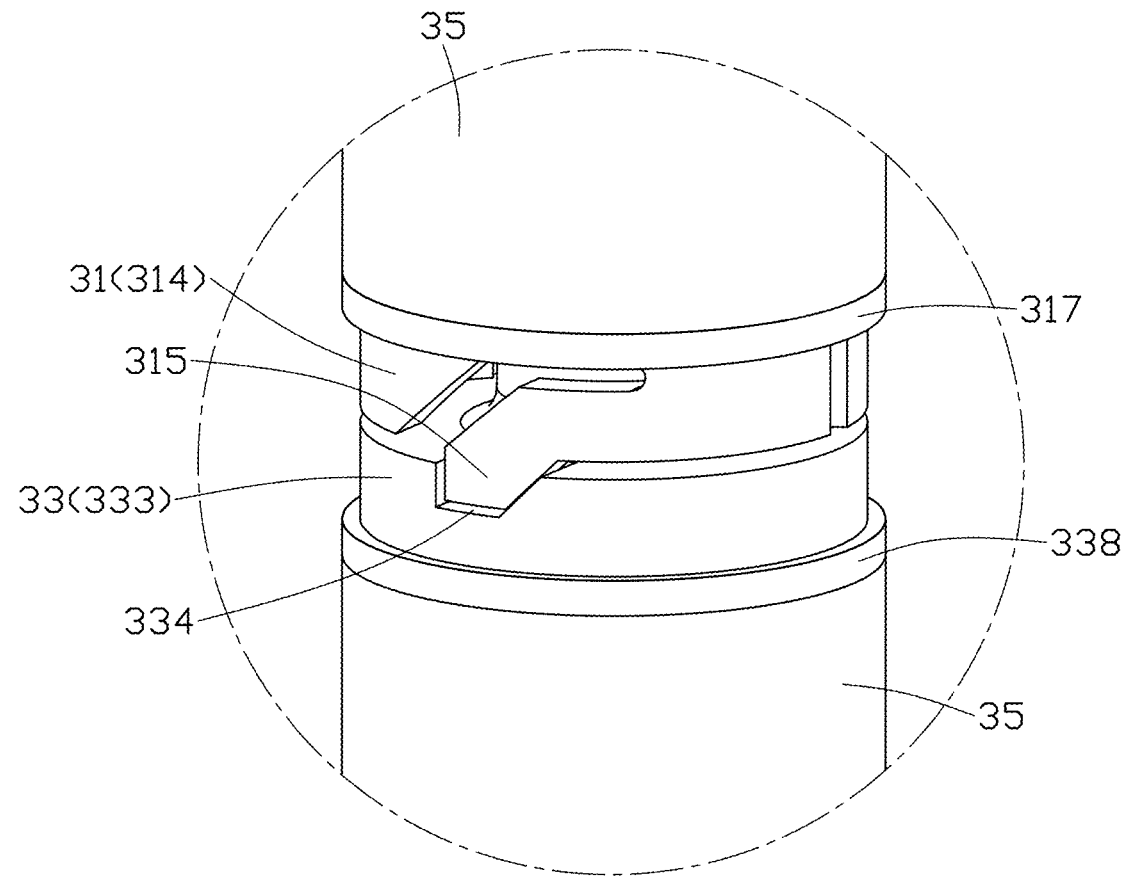
FIG. 8 is an enlarged detail view of region VII in FIG. 4.

The boss 333 is disposed on the flange portion 338 opposite to the second connection portion 331 and has a generally frustoconical shape. Two limiting grooves 334 are formed symmetrically about the central axis Z2 of the second connector 33, recessed inward at outer positions on the top surface 3331 of the boss 333, for engaging and securing the elastic members 315 of the helical engagement portion 312 of the first connector 31. As shown in FIG. 8, the outer diameter of the boss 333 is equal to the outer diameter of the helical engagement portion 312. In the connected state, the top surface of the fixed portion 314 and the top surface of the boss 333 abut against each other in close contact.

Each limiting groove 334 is notch-shaped and includes a first side surface 3341 extending from the top surface 3331 toward the flange portion 338, a second side surface 3343 opposite the first side surface 3341, a third side surface 3345 connecting the first and second side surfaces, and a bottom surface 3347 connecting them. The first side surface 3341 is an inclined surface, and its inclination angle is consistent with that of the first surface 3151 of the elastic element 315. Sometimes, the first side surface 3341 is also referred to as a guide surface. The bottom surface 3347 matches the shape and size of the second surface 3153 of the elastic element 315. Preferably, the second side surface 3343 intersects the bottom surface 3347 vertically, allowing at least part of the elastic element 315 (especially the first, second, and third surfaces 3151, 3153, and 3155) to fit snugly into the limiting groove 334 in the assembled state, positioning the first and second connectors circumferentially. The structures of the elastic element 315 and the limiting groove 334 are not limited to this, as long as the same function is achieved.

The insertion part 335 extends from the center of the boss 333 away from the flange portion 338. The insertion part 335 is inserted into the recess 3140 of the fixed portion 314 of the first connector 31 and can be fixed vertically to the first connector 31. It includes an insertion main body 336 and a sliding block 337.

The insertion main body 336 is cylindrical, and its diameter is preferably slightly smaller than that of the circular trajectory where the arc-shaped side surfaces 3163 of the protrusion blocks 316 are located, so as to allow the insertion main body 336 to be easily inserted between the arc-shaped side surfaces 3163 of the two symmetrically disposed protrusion blocks 316.

The two sliding blocks 337 are disposed centrally symmetrically relative to the central axis Z2 of the second connector 33. They are arranged on the outer side surface of the insertion main body 336 and extend outward. Specifically, the sliding blocks 337 are configured as helical plates extending along a helical path 337a and are helical segments with a second helix angle. The second helix angle is defined as the angle between a tangent to the helical path 337a and the central axis Z2 of the second connector 33. Furthermore, the first helix angle of the protrusion blocks 316 is identical to this second helix angle. The sliding blocks 337 extend obliquely and helically along the circumferential direction of the main body 336. Their starting ends are adjacent to the top of the main body 336, which is remote from the boss 333, and their terminal ends extend toward the side of the boss 333. That is, in the first embodiment, the distance from the starting end of a sliding block 337 to the boss 333 is greater than the distance from its terminal end to the boss 333.

Specifically, the sliding blocks 337 are formed near the top side of the insertion main body 336. When viewed along the central axis Z2, they are centrally located relative to the two limiting grooves 334. Each sliding block includes a top surface 3371 and a bottom surface 3373 (see FIG. 11). Its outer surface is also arc-shaped. When viewed along the central axis Z2, the diameter of the circular trajectory of this outer surface is larger than that of the arc-shaped side surface 3163 of the protrusion blocks 316 but smaller than the inner diameter of the spiral engagement portion 312. This configuration allows the sliding blocks 337 to be stacked on top of the protrusion blocks 316. In the present embodiment, the sliding blocks 337 also extend helically with a radian of approximately 90 degrees. However, the shape of the sliding blocks 337 is not limited thereto. They can be of other shapes, if they can be inserted into the insertion space between the two protrusion blocks 316 and the recess 3140 and can slide and rotate along the support surface 3165 of the protrusion blocks.

For ease of manufacturing, the second connector 33 is also preferably integrally formed from the same material as the first connector 31.

Figure 9:
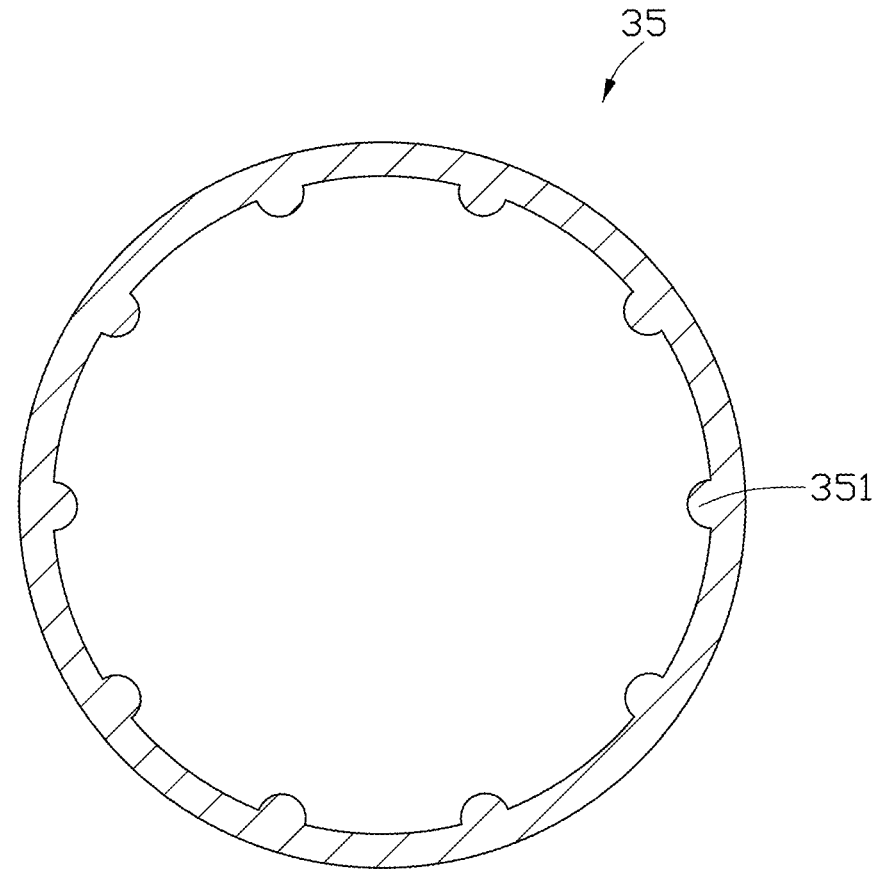
FIG. 9 is a transverse cross-sectional view of a support tube of the quick-connect assembly.
Figure 10:
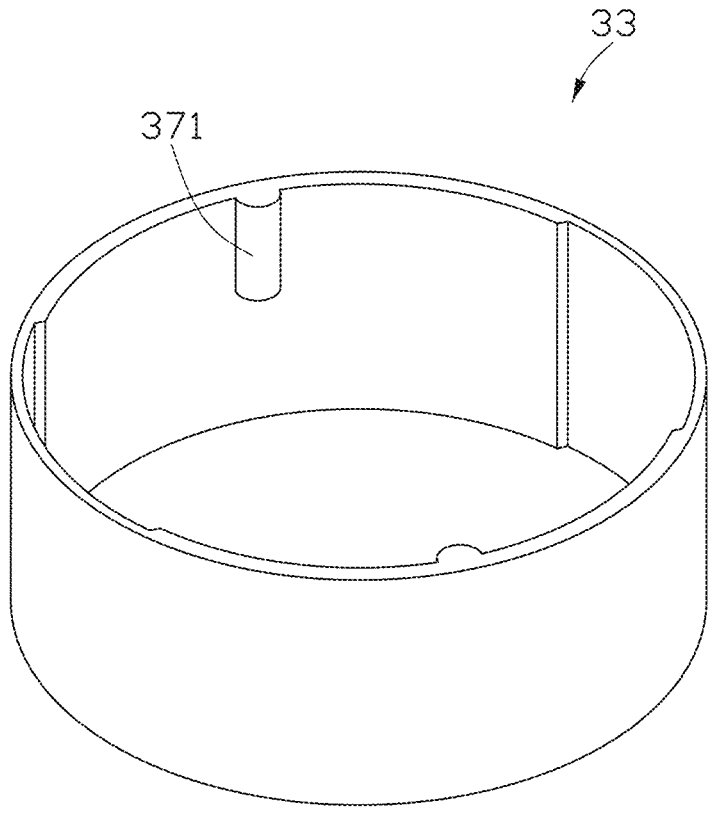
FIG. 10 is a perspective view of an auxiliary support member configured for the quick-connect assembly.

The support tube 35 is cylindrical. Referring to FIGS. 3 and 9, its inner surface has multiple longitudinal ribs 351 along the vertical direction to engage with the fixed connection portions of the first and second connectors, with its ends tightly contacting the flange portions (317, 338) of the first and second connectors, and the support tube 35 functions as the support legs of the furniture 100. The length and material of the support tube 35 can be adjusted based on the design of the furniture 100, as long as the aforementioned functions are achieved for stable support.

The auxiliary support member 37 has a structure similar to the support tube 35, with a length slightly greater than the combined lengths of the boss 333 and the fixed portion 314. In the assembled state, the flange sections 317 and 338 clamp the auxiliary support member 37, enhancing stability. Similarly, the thickness of the layer plate 13 is slightly greater than the combined lengths of the boss 333 and the fixed portion 314 to allow the first and second connectors to clamp the layer plate 13. For further stability, the lengths of the boss 333 and the fixed portion 314 are preferably equal.

Figure 12:
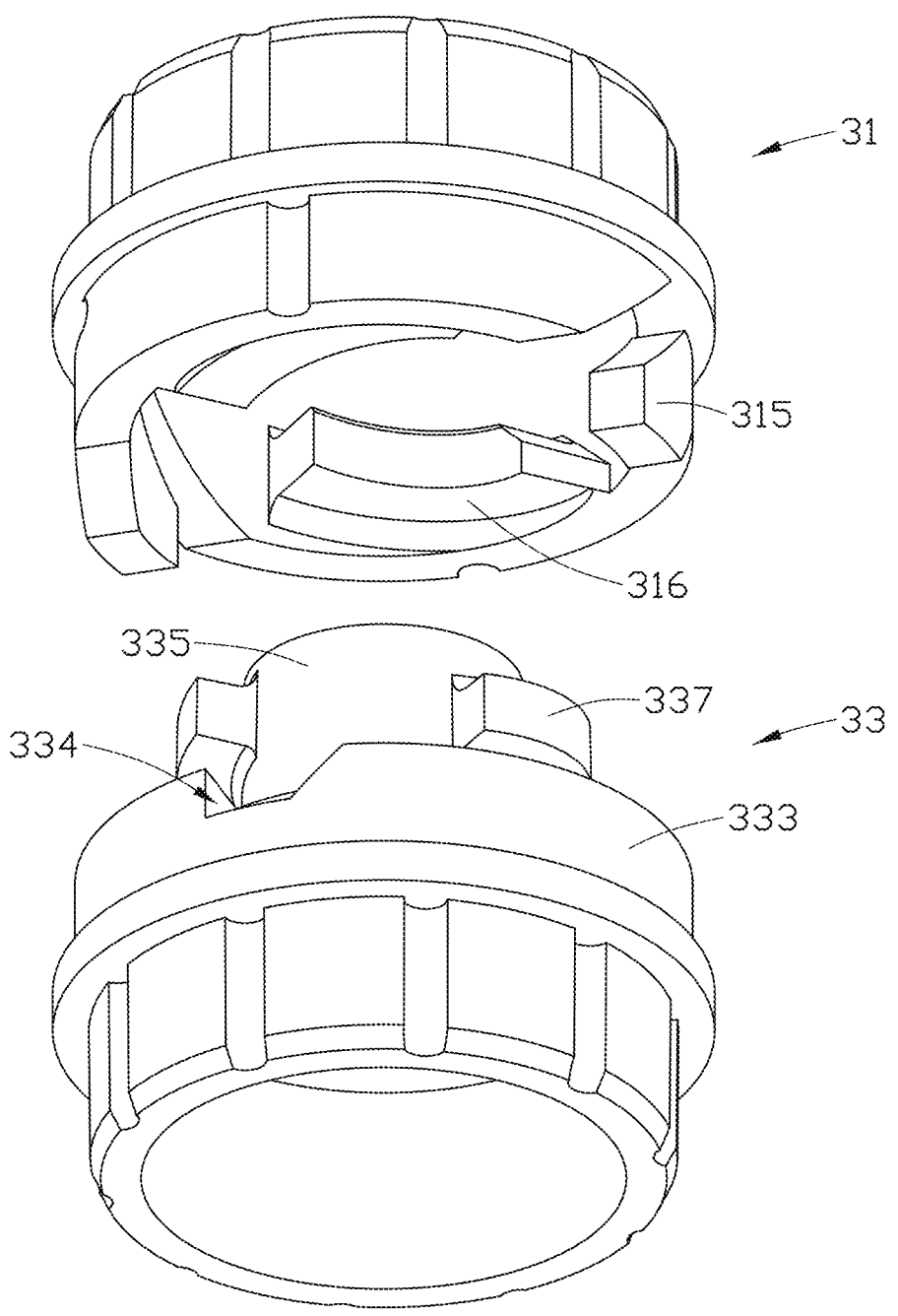
FIG. 12 is a perspective view of the first and the second connectors in an assembled configuration.

Referring to FIG. 12, when connecting the first connector 31 and the second connector 33, the user inserts the insertion part 335 of the second connector 33 between the protrusion blocks 316 of the first connector 31. The user can either directly insert the sliding block 337 into the insertion space between the two protrusion blocks 316 and the recess 3140 by visual alignment, or, without precise alignment, allow the top surface 3371 of the sliding block 337 to contact the top surface 3161 of the protrusion block 316 and insert the sliding block 337 into the insertion space through helical rotation. During insertion, the side of the bottom surface 3373 of the sliding block 337 that is close to the top end of the insertion main body 336 can come into contact with the side of the support surface 3165 of the protrusion block 316 that is close to the top end 3143 of the fixed portion 314, and at the same time, the elastic element 315 abuts against the boss 333. When the sliding blocks 337 slide along the support surface 3165 and rotate spirally, the elastic element 315 is elastically deformed by the boss 333 and moves toward the limiting groove 334. When continuing to rotate until the elastic element 315 is pushed by the pressing force along the first side surface 3341 and slides into the limiting groove 334, that is, when the elastic element 315 snaps into the limiting groove 334, it undergoes elastic reset. The resilient force generated by this elastic reset collides with the limiting groove 334, thereby producing vibration and a sound. This tactile and auditory feedback signals to the user that the installation is complete. At this point, the elastic element 315 is restricted from further circumferential movement by the second side surface 3343 of the limiting groove 334 and from reverse rotation (opposite to the installation direction) by friction with the first side surface 3341. Thus, the elastic element 315 and the limiting groove 334 lock together, restricting circumferential displacement of the first and second connectors.

Figure 11:
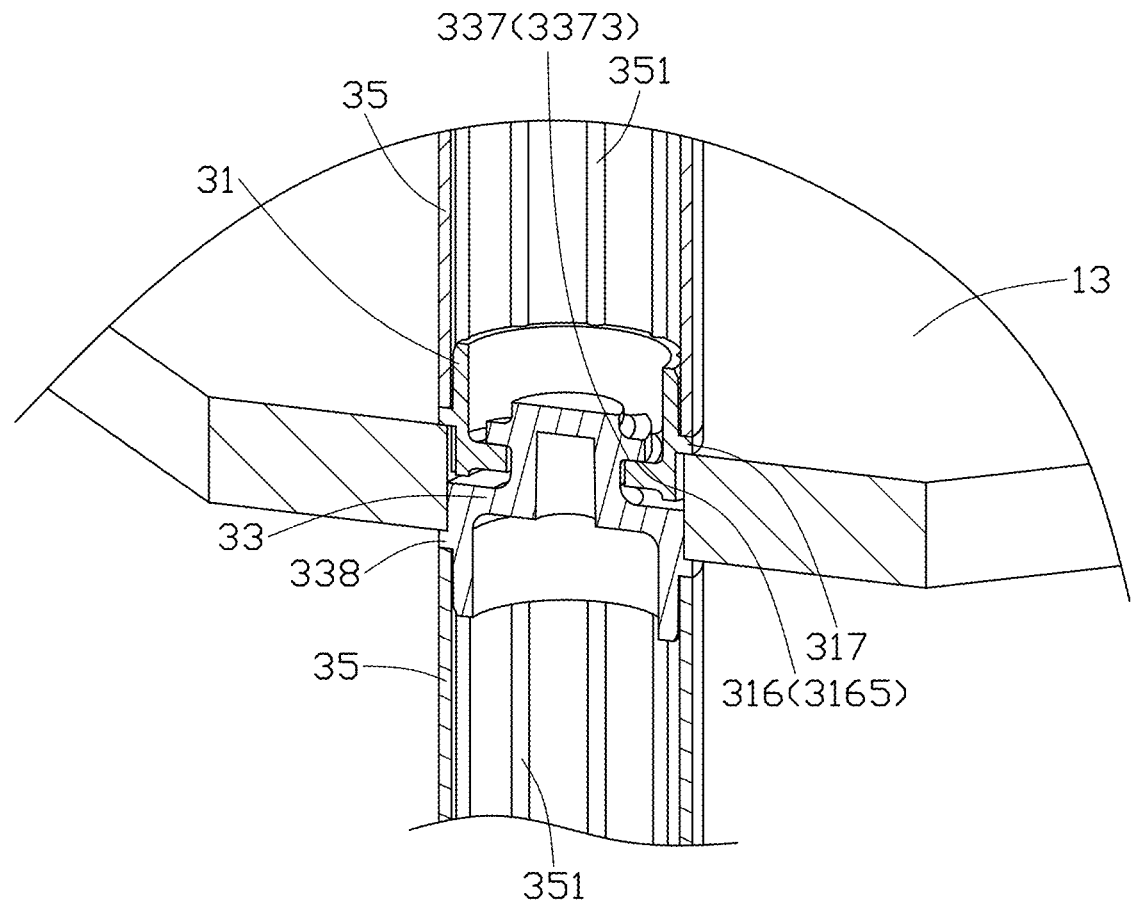
FIG. 11 is an enlarged cross-sectional view of a portion of the piece of furniture.

Referring to FIG. 11, since the inner diameter of the through-hole 131 of the laminate 13 is the same as the outer diameters of the spiral engagement portion 312 and the boss 333, the displacement of the first connector 31 and the second connector 33 in the horizontal direction is further completely restricted in the assembled state. At this point, because the thickness of the layer plate 13 is slightly greater than the sum of the thicknesses of the spiral engagement portion 312 and the boss 333, a force that separates the first connector 31 and the second connector 33 from each other in the vertical direction is generated. Meanwhile, as the sliding block 337 also rotates helically to a position stacked on the protrusion block 316, this separating force causes the sliding block 337 to tightly abut against the protrusion block 316, and friction is generated between their contact surfaces. As a result, the displacement of the first connector 31 and the second connector 33 in the vertical direction is also completely restricted, thereby locking the connection between the first connector 31 and the second connector 33. This can enhance the stability of the assembled furniture 100.

In addition, when disassembly is required, the user only needs to apply a reverse force to cause the elastic element 315 to elastically deform and disengage from the limiting groove 334, and then rotate it reversely by 90 degrees. This rotation moves the sliding block 337 from the position where it is stacked on the protrusion block 316 to the position between the insertion spaces formed between the two protrusion blocks 316 and the recess 3140, thereby separating the first connector 31 and the second connector 33. Thus, the assembly and disassembly operations can be performed conveniently.

To further enhance convenience, it is preferable that the second connector 33 is also pre-fixed to the support tube 35; for example, it can be completely fixed with glue or the like to form an integral body. Therefore, during assembly and disassembly, the support tube 35 can function as a grip portion. When installing, the user only needs to hold the support tube 35, insert the second connector 33 into the first connector 31 (after the sliding block 337 is inserted into the insertion space), and then rotate it by 90 degrees (i.e., rotate a quarter turn) to complete the installation. When disassembling, the user only needs to hold the support tube 35 and rotate it reversely by 90 degrees (i.e., rotate a quarter turn in the reverse direction) to disengage the second connector 33 from the first connector 31, which greatly improves the convenience of assembly and disassembly. Moreover, since both the sliding block 337 and the protrusion block 316 are configured as helical segments with the same helix angle, the helical curved surfaces between them provide guidance, enabling the second connector 33 to be smoothly inserted into the first connector 31 without precise alignment, thus realizing blind operation. As a result, the user can quickly perform assembly and disassembly operations without rotating multiple turns, leading to an excellent user experience.

In the assembled state, multiple contact surfaces between the first and second connectors bear forces uniformly. Additionally, the contact surfaces between the first connector 31 and the top plate 11 (or layer plate 13) and the auxiliary support member 37 (or support tube 35), as well as between the second connector 33 and the support tube 35 or layer plate 13, further enhance the stability of the furniture 100.

This embodiment achieves a simple structure for easy assembly and disassembly, reducing manufacturing difficulty and costs while improving production efficiency.

In this embodiment, the number of first connectors 31, second connectors 33, and support tubes 35 in the quick-connect assembly 30 is the same and determined by the number of load-bearing components 10. For example, in FIG. 2, the load-bearing component 10 includes one top plate 11 and two layer plates 13 (three plates in total), so the quick-connect assembly 30 includes three first connectors 31, second connectors 33, and support tubes 35. If the load-bearing component 10 only includes the top plate 11, the numbers are reduced to one each.

The quick-connect assembly 30 is placed at the four corners of the load-bearing component 10 in this embodiment, but the number may vary based on the furniture design. Similarly, the number of protrusion blocks 316 and sliding blocks 337 may be one or more, as long as the same function is achieved.

In this embodiment, an example with a pair of protrusion blocks (a first protrusion block and a second protrusion block) 316 and sliding blocks (a first sliding block and a second sliding block) 337 is shown; however, this is not limiting. As long as the same function can be achieved, in another embodiment, the number of protrusion blocks 316 and sliding blocks 337 may be one, or two or more. For example, when both the protrusion block 316 and the sliding block 337 are provided in a single number, the helical extension arc of the protrusion block 316 and the sliding block 337 need only not exceed 180 degrees. In this case, it can also restrict the relative rotation angle between the first connector 31 and the second connector 33 to no more than one full turn.

Additionally, in this embodiment, an example is shown with a pair of oppositely arranged elastic elements (a first elastic element and a second elastic element) 315 and limiting grooves (a first limiting groove and a second limiting groove) 334; however, this is not limiting. In another embodiment, only one elastic element 315 and one limiting groove 334 may be provided.

While the quick-connect assembly 30 is part of the furniture 100 in this embodiment, it can also serve as an extension tube in other applications. In such cases, the user can manually rotate the first and second connectors to lock them together. The locked state is achieved when the sliding blocks 337 and the protrusion blocks 316 are spirally rotated to a position where the fixed portion 314 and the boss 333 tightly contact, and the third surface 3155 of the elastic element 315 tightly contacts the second side surface 3343 of the limiting groove 334, generating maximum friction to lock the connection in both vertical and circumferential directions.

To further enhance stability, a base can be added to the end of the support tube 35 in contact with the placement surface (e.g., the ground) to increase friction.

In accordance with a second embodiment, a connection structure 30 has a configuration substantially similar to that described in the first embodiment. A difference, however, is that to further improve assembly and disassembly convenience, the elastic element 315 of the first connector 31 and the limiting groove 334 of the second connector 33 are omitted. In this configuration, the spiral engagement portion 312 may be configured as a complete cylindrical tube.

With such a configuration, when connecting the first connector 31 and the second connector 33, the sliding block 337 can still be smoothly inserted between the protrusion blocks 316. Moreover, by setting the helix angles of the protrusion blocks 316 and the sliding blocks 337, when rotated by 90 degrees, the sliding block 337 is stacked on the protrusion block 316, and the top surface of the spiral engagement portion 312 abuts against the top surface 3331 of the boss 333 to restrict further rotation. This also restricts the displacement of the first connector 31 and the second connector 33 in the vertical direction. Thus, when assembling or disassembling the furniture 100 using the quick-connect assembly 30, less effort is required, thereby further enhancing the user experience.

Omitting the elastic element 315 and the limiting groove 334 further streamlines the structure, further lowering manufacturing difficulty and costs while boosting production efficiency.

Figure 13:
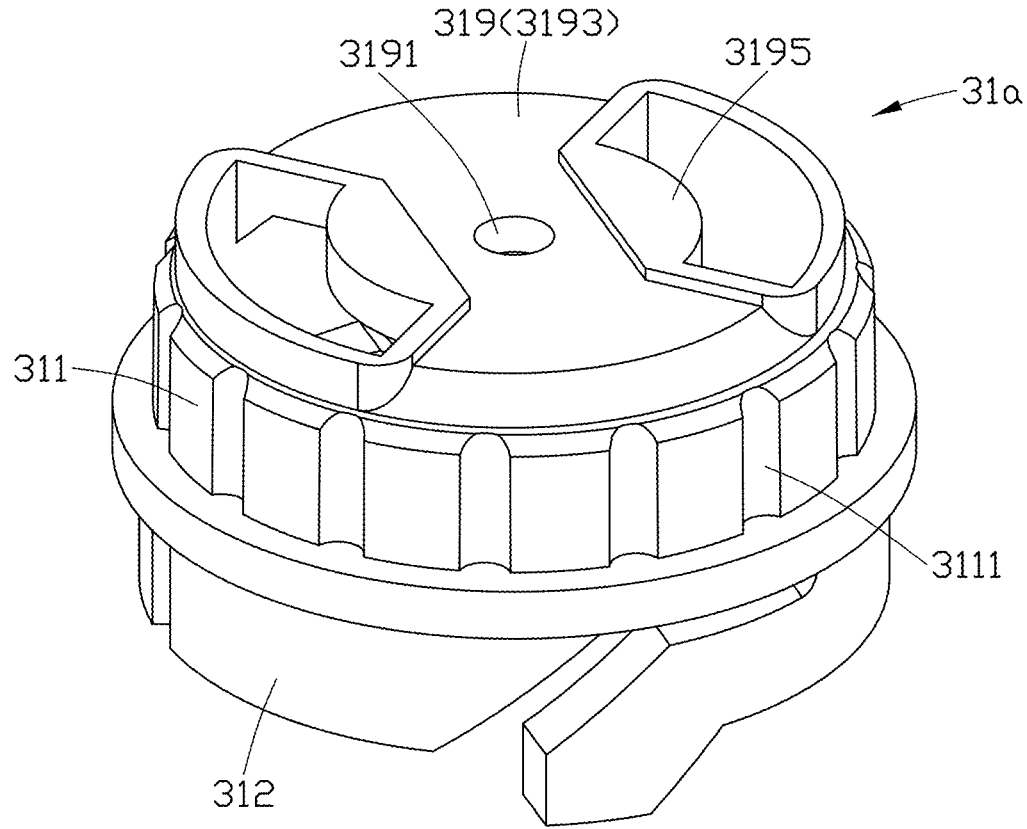
FIG. 13 is a perspective view of an embodiment of an alternative first connector.

A third embodiment of the invention is detailed with reference to FIG. 13. For ease of explanation, components having the same functions as those described in the aforementioned embodiments are denoted by the same reference numerals, and a repeated description thereof is omitted.

In the first embodiment, the first connector 31 is a tubular structure open at both ends. In the third embodiment, the first connector 31 connected to the top plate 11 further includes an adhesive injection portion 319.

The adhesive injection portion 319 is formed at the top of the first connection portion 311. A central injection hole 3191 is formed through the adhesive injection portion 319 at its central position, and on its top surface 3193, abutment portions 3195 are symmetrically provided on opposite sides of the injection hole 3191 in a manner that protrudes from the top surface. With such a configuration, when the first connector is placed into the recessed slot 111, the top surface of the abutment portions 3195 abuts against the bottom surface of the recessed slot 111. By injecting adhesive into the injection hole 3191, the adhesive flows from the injection hole 3191 toward the two sides where no abutment portions 3195 are provided and enters the axial grooves 3111. In addition, the spacing between the axial grooves 3111 can be set to be denser than that of the axial grooves 3111 on the first connector 31 connected to the layer plate 13. Thus, in Embodiment 3, on the basis of the above-mentioned effects of Embodiment 1, the first connector 31 can be more firmly fixed to the top plate 11, thereby further enhancing the stability of the assembled furniture 100.

The disclosed embodiments are illustrative and not restrictive. The scope of the present disclosure is defined by the claims and includes all equivalents.

What is claimed is:

1. A quick-connect assembly, comprising:
a first connector and a second connector detachably and coaxially coupled to the first connector by rotating the first connector and the second connector relative to each other,
wherein the first connector comprises a recess on one side of the first connector, and at least one protrusion block protruding inward from an inner wall of the recess, wherein each of the at least one protrusion block is a helical segment defining a first helix angle, each of the at least one protrusion block extends along a helical path, an arc defined by each of the at least one protrusion block is less than 180 degrees;
the second connector comprises an insertion part, and at least one sliding block protruding outward from a peripheral surface of the insertion part, wherein each of the at least one sliding block is a helical segment defining a second helix angle, each of the at least one sliding block extends along the helical path, an arc defined by each of the at least one sliding block is less than 180 degrees, the second helix angle is equal to the first helix angle;
in a case that the insertion part is inserted into the recess and the first connector and the second connector are rotated relative to each other, the at least one sliding block is slidable along and abuts against a support surface defined by the at least one protrusion block;
the first connector further comprises a first elastic element, and the second connector further comprises a first limiting groove,
wherein, in response to the first connector and the second connector are rotated to each other, the first elastic element moves relative to the first limiting groove; and
the first connector is configured to restrict a relative rotation angle between the first connector and the second connector to no more than 360 degrees by receiving the first elastic element in response to the first limiting groove is moved proximate to the first elastic element and abuts against the first elastic element.

2. The quick-connect assembly of claim 1, wherein:
the first elastic element extends circumferentially from one side of the recess to form a cantilever, and is spaced apart from an extended surface of a bottom end of the recess to form a first space parallel to the extended surface;
at least a portion of the first elastic element protrudes from a top end of the recess and extends obliquely toward another side of the recess;

the first elastic element is spaced apart from the other side of the recess to form a second space inclined relative to the bottom end surface; and
the first space and the second space are in communication.

3. The quick-connect assembly of claim 2, wherein:
the at least a portion of the first elastic element comprises a first surface inclined relative to the top end of the recess; and
the first limiting groove comprises an inclined guide surface defining a same inclination angle as the first surface, the guide surface is configured to guide the first elastic element into or out of the first limiting groove in response to the first connector and the second connector are rotated to each other, respectively.

4. The quick-connect assembly of claim 3, wherein:
the at least one protrusion block comprises two protrusion blocks, a first protrusion block and a second protrusion block, that are discontinuously arranged, wherein an insertion space is formed between the first protrusion block, the second protrusion block, and the recess; and
the at least one sliding block comprises a first sliding block and a second sliding block discontinuously arranged, wherein the first sliding block and the second sliding block are insertable into the insertion space.

5. The quick-connect assembly of claim 4, wherein:
the first protrusion block and the second protrusion block are centrally symmetrically disposed on the recess; and
the first sliding block and the second sliding block are centrally symmetrically disposed on the insertion part.

6. The quick-connect assembly of claim 5, wherein:
the first connector further comprises a second elastic element, the first elastic element and the second elastic element are centrally symmetrically disposed on the first connector;
the second connector further comprises a second limiting groove, the first limiting groove and the second limiting groove are centrally symmetrically disposed on the second connector; and
wherein the first limiting groove and the second limiting groove are configured to restrict the relative rotation angle between the first connector and the second connector to 90 degrees or less.

7. The quick-connect assembly of claim 6, wherein:
the first elastic element and the second elastic element are circumferentially disposed on the first connector between the first protrusion block and the second protrusion block, respectively; and
the first limiting groove and the second limiting groove are circumferentially disposed on the second connector between the first sliding block and the second sliding block, respectively.

8. The quick-connect assembly of claim 6, wherein:
the second connector further comprises a boss, and the insertion part protrudes from a central portion of the boss; and
the first limiting groove and the second limiting groove are formed on a peripheral side of the boss.

9. The quick-connect assembly of claim 8, wherein:
during a coupling rotation of the first connector and the second connector, at least a portion of the first elastic element and at least a portion of the second elastic element abut against the boss and elastically deform within the first space and the second space, respectively; and
when rotated to a position where the first elastic element and the second elastic element snap into the first limiting groove and the second limiting groove, respectively, the first elastic element and the second elastic element elastically reset, and a resilient force generated by the elastic reset causes impact with the first limiting groove and the second limiting groove, thereby providing tactile and auditory feedback to an operator.

10. The quick-connect assembly of claim 6, wherein:
the recess comprises a first recess portion and a second recess portion centrally symmetrically and spacedly disposed on the first connector;
the first elastic element extends circumferentially from one side of the first recess portion, and at least a portion thereof protrudes from a top end of the first recess portion and extends obliquely toward the second recess portion; and
the second elastic element extends circumferentially from one side of the second recess portion, and at least a portion thereof protrudes from a top end of the second recess portion and extends obliquely toward the first recess portion.

11. The quick-connect assembly of claim 5, wherein:
a starting end of the first protrusion block and a starting end of the second protrusion block extend to proximate a top end of the recess; and
a starting end of the first sliding block and a starting end of the second sliding block extend to proximate a top end of the insertion part.

12. The quick-connect assembly of claim 5, wherein:
the first protrusion block and the second protrusion block extend helically for an arc of 90 degrees.

13. The quick-connect assembly of claim 4, wherein:
the guide surface of the first limiting groove constitutes a side wall of the first limiting groove and extends from a position adjacent to a terminal end of one of the first sliding block and the second sliding block in a direction away from the one sliding block.

14. The quick-connect assembly of claim 13, wherein:
a bottom end of the guide surface is adjacent to a starting end of the other of the first sliding block and the second sliding block.

15. The quick-connect assembly of claim 1, further comprising:
a support tube having an inner surface provided with axially extending ribs;
wherein the first connector and the second connector each further comprise a fixed connection portion having an outer surface provided with axially extending grooves configured to matingly engage with the ribs of the support tube.

16. A method of assembling using the quick-connect assembly of claim 1, the method comprising:
providing the first connector;
providing the second connector;
axially inserting the insertion part into the recess; and
relatively rotating the first connector and the second connector until the at least one protrusion block and the at least one sliding block abut against each other and the first elastic element snaps into the first limiting groove.

17. The method of claim 16, further comprising, prior to axially inserting the insertion part into the recess:
providing a top plate having a recessed slot, and pre-fixing the first connector into the recessed slot; and
providing a support tube, and pre-fixing the second connector to the support tube.

18. An assemblable furniture, comprising:
at least one load-bearing component;
a plurality of quick-connect assemblies according to claim 1; and
a plurality of support tubes;
wherein the at least one load-bearing component is assembled with the plurality of support tubes via the plurality of quick-connect assemblies, respectively.

19. The furniture of claim 18, wherein:
the at least one load-bearing component comprises a top plate;
a back side of the top plate is provided with a plurality of recessed slots configured for insertion and fixation of the first connectors of the quick-connect assemblies.

20. The furniture of claim 18, wherein:
the at least one load-bearing component further comprises a layer plate, the layer plate having a plurality of through-holes formed therethrough;
wherein, in an assembled state, at least a portion of the first connector and at least a portion of the second connector are inserted into a respective through-hole from opposite sides and connected within the through-hole, such that the layer plate is clamped between the first connector and the second connector.

* * * * *